US010366847B2

(12) United States Patent
Berardengo et al.

(10) Patent No.: US 10,366,847 B2
(45) Date of Patent: Jul. 30, 2019

(54) DEVICE FOR GUIDING A SPRING IN A CONTROL MECHANISM AND ELECTRICAL PROTECTION APPARATUS COMPRISING SAME

(71) Applicant: Schneider Electric Industries SAS, Rueil-Malmaison (FR)

(72) Inventors: Florent Berardengo, Saint Martin le Vinoux (FR); Dominique Treffot, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/845,074

(22) Filed: Dec. 18, 2017

(65) Prior Publication Data
US 2018/0182569 A1    Jun. 28, 2018

(30) Foreign Application Priority Data
Dec. 22, 2016    (FR) ..................... 16 63097

(51) Int. Cl.
*H01H 3/30* (2006.01)
*H01H 35/00* (2006.01)
*H01H 3/60* (2006.01)
*F16F 1/12* (2006.01)

(52) U.S. Cl.
CPC ............ *H01H 3/30* (2013.01); *F16F 1/128* (2013.01); *H01H 3/60* (2013.01); *H01H 35/006* (2013.01)

(58) Field of Classification Search
CPC ...... H01H 2235/01; H01H 1/20; H01H 21/16; H01H 71/04; H01H 83/12; H01H 85/0241;
(Continued)

(56) References Cited

U.S. PATENT DOCUMENTS 4,225,763 A * 9/1980 Barkan ............... H01H 33/666
                                                                218/120
4,497,992 A * 2/1985 Kodera ................. H01H 3/30
                                                                200/400
(Continued)

FOREIGN PATENT DOCUMENTS

DE    94 16 903 U1    2/1996
DE    195 04 961 A1   8/1996
(Continued)

OTHER PUBLICATIONS

French Preliminary Search Report dated Sep. 11, 2017 in French Application 16 63097 filed Dec. 22, 2016 (with English Translation of Categories of cited documents).

*Primary Examiner* — Truc T Nguyen
(74) *Attorney, Agent, or Firm* — Oblon, McClelland, Maier & Neustadt, L.L.P.

(57) ABSTRACT

A device is for guiding a spring belonging to a control mechanism. The device includes two elements capable of sliding relative to one another and being linked in an articulated manner respectively to two axes of which at least one is linked mechanically to an operating shaft, and a compression spring mounted around these two elements and bearing by its two opposing ends respectively on the abovementioned two axes via, respectively, two bases, each of its bases being mounted in an articulated manner relative to one of the abovementioned axes. This device includes two rods, each rod being fixed by one of its ends onto one of the abovementioned bases, and being mounted to slide by its opposite end, relative to the other of the abovementioned bases.

12 Claims, 8 Drawing Sheets

Figure 1:
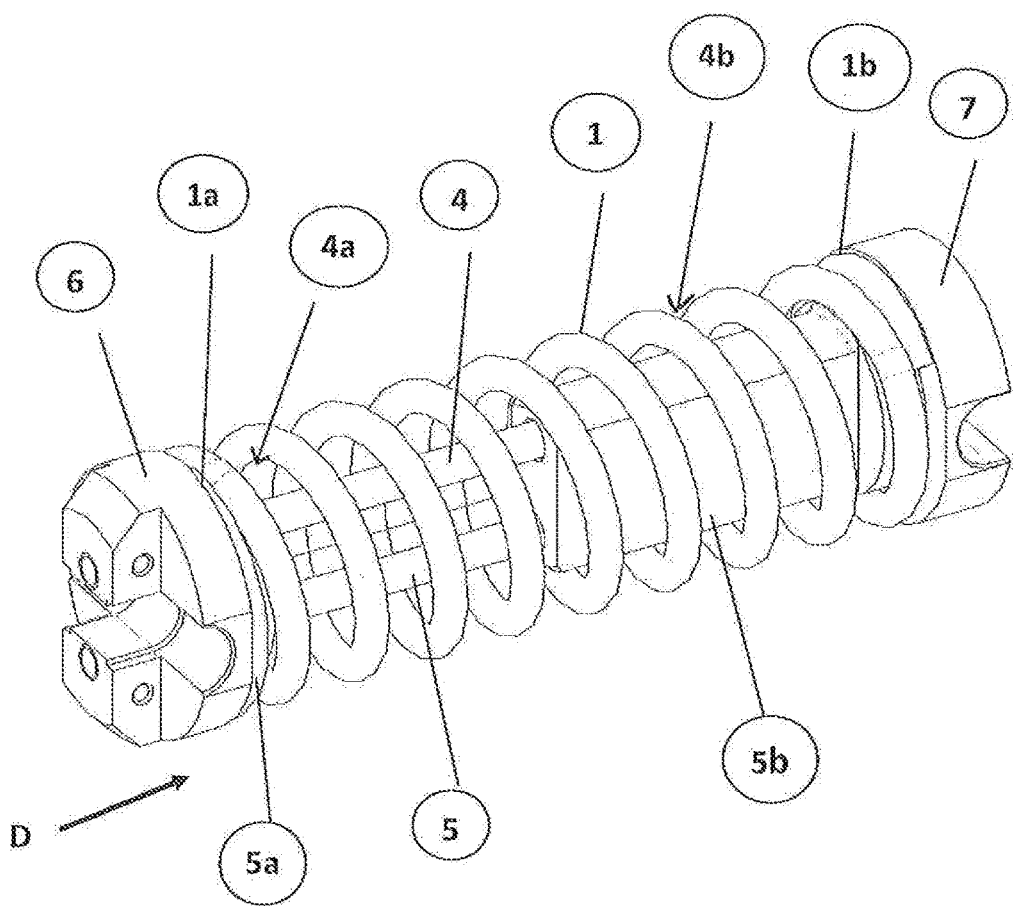

(58) Field of Classification Search
 CPC ............ H01H 9/10; H01H 9/282; H01H 3/38;
 H01H 71/1009; H01H 83/10; H01H
 2071/0278; H01H 2205/002; H01H
 33/10; H01H 71/00
 See application file for complete search history.

(56) References Cited

U.S. PATENT DOCUMENTS

| | | | | |
|---|---|---|---|---|
| 4,568,806 | A * | 2/1986 | Frink | H01H 33/91 |
| | | | | 218/57 |
| 4,713,508 | A * | 12/1987 | Baginski | H01H 3/30 |
| | | | | 185/45 |
| 5,206,616 | A * | 4/1993 | Stegmuller | H01H 33/666 |
| | | | | 218/136 |
| 5,508,487 | A * | 4/1996 | Smith | H01H 3/3031 |
| | | | | 200/400 |
| 7,115,828 | B2 * | 10/2006 | McCord | H01H 3/3031 |
| | | | | 200/400 |
| 2001/0027915 | A1 * | 10/2001 | Narayanan | H01H 71/70 |
| | | | | 200/400 |
| 2001/0027959 | A1 * | 10/2001 | Narayanan | H01H 71/70 |
| | | | | 218/22 |
| 2013/0186231 | A1 | 7/2013 | Belin | |
| 2015/0102246 | A1 | 4/2015 | Leger et al. | |

FOREIGN PATENT DOCUMENTS

| | | |
|---|---|---|
| DE | 2 832 473 A1 | 5/2003 |
| EP | 2 602 804 A1 | 6/2013 |

* cited by examiner

DEVICE FOR GUIDING A SPRING IN A CONTROL MECHANISM AND ELECTRICAL PROTECTION APPARATUS COMPRISING SAME

TECHNICAL FIELD

The present invention relates to a device for guiding a spring belonging to a control mechanism, this device comprising two elements capable of sliding relative to one another and being linked in an articulated manner respectively to two axes of which at least one is linked mechanically to an operating shaft, and a compression spring mounted around these two elements and bearing by its two opposing ends respectively on the abovementioned two axes via, respectively, two bases, each of its bases being mounted articulated relative to one of the abovementioned axes.

PRIOR ART

Guiding devices for guiding compression springs are known, whose function is either to provide an additional aid intended to add power and speed to the operation by a user, of an output shaft of the mechanism, or to actuate an operating device in place of a user by an arming of the spring by compression thereof followed by an abrupt decompression of this spring producing the actuation of the output/driving device.

Thus, such a subassembly can be mounted either between two axes belonging respectively to two operating cranks of two shafts, or between an operating crank axis and a fixed axis.

Also known is a device for guiding a spring belonging to a control mechanism, this device comprising two connecting rods capable of sliding relative to one another and linked in an articulated manner respectively by their free ends to two axes of which at least one is linked mechanically to a so-called operating shaft, and a compression spring bearing by its two opposing ends respectively on the abovementioned two axes. This device comprises means for slidingly guiding the two connecting rods relative to one another, these guiding means comprising orifices and rivets, a closed oblong orifice formed at one of the ends of each of the connecting rods, an open oblong orifice being formed at the other end of each of the connecting rods, said connecting rods being mounted top to tail, the closed oblong orifices being capable of respectively keeping the two axes captive, the two open oblong orifices being capable of allowing the two axes respectively to escape, so as to vary the guiding travel during the phases of compression and of decompression of the spring.

Now, in this device, a poor spring guiding quality may be observed during the opening and closing phases that may produce a phenomenon of tarnishing of the spring on the connecting rods, which can lead to a degradation of the rivets, and a cracking of the guiding base.

The present invention resolves these problems and proposes a device for guiding a spring in a control mechanism that makes it possible to obtain a correct alignment of the force of the spring relative to the trajectory of this spring, this making it possible to limit the risks of deformation of the spring and therefore to be able to use less expensive parts. Another subject of the present invention is an electrical protection apparatus comprising such a guiding device.

SUMMARY OF THE INVENTION

To this end, the subject of the present invention is a device for guiding a spring belonging to a control mechanism of the kind mentioned previously, this device being characterized in that it comprises two elements capable of sliding relative to one another and being linked in an articulated manner respectively to two axes of which at least one is linked mechanically to an operating shaft, and a compression spring mounted around the two parts and bearing by its two opposing ends respectively on the abovementioned two axes via, respectively, two bases. This device is characterized in that it comprises two rods, each rod being fixed by one of its ends onto one of the abovementioned bases, and being mounted to slide by its opposite end, relative to the other of the abovementioned bases.

According to a particular embodiment, the abovementioned two rods are fixed by one of their ends, these two ends being situated on one and the same side of the assembly consisting of the two rods, to a so-called first base, in such a way that they extend parallel to one another, and are mounted to slide by their opposite end, these ends being situated on the side opposite the preceding one, relative to a so-called second base.

According to a particular feature, the so-called second base comprises an extension-forming portion extending in the direction of the so-called first base, this so-called guiding portion gripping the two rods while allowing the sliding of these rods inside said portion and constituting, by its outer surface, a means for guiding the spring.

According to another feature, the abovementioned guiding portion extends over a length corresponding substantially to half of the length of the rods.

According to a particular feature, the respectively first and second two rods are fixed by one of their ends respectively to the two respectively first and second bases, and each first and second base comprises a sleeve-forming part capable of slidingly receiving the free end of, respectively, the second and the first rod, in such a way, that when these free ends are mounted in the corresponding sleeves, said rods extend substantially parallel to one another.

According to another feature, the abovementioned two sleeve-forming parts constitute, by their outer surface, a means for guiding the spring.

According to another feature, the abovementioned two sleeve-forming parts extend over a length corresponding substantially to half of the length of the rods.

Another subject of the present invention is an electrical protection apparatus comprising a spring guiding device comprising the features mentioned previously taken alone or in combination.

According to a particular feature, this apparatus is a medium voltage switch-disconnector.

Figure 2:
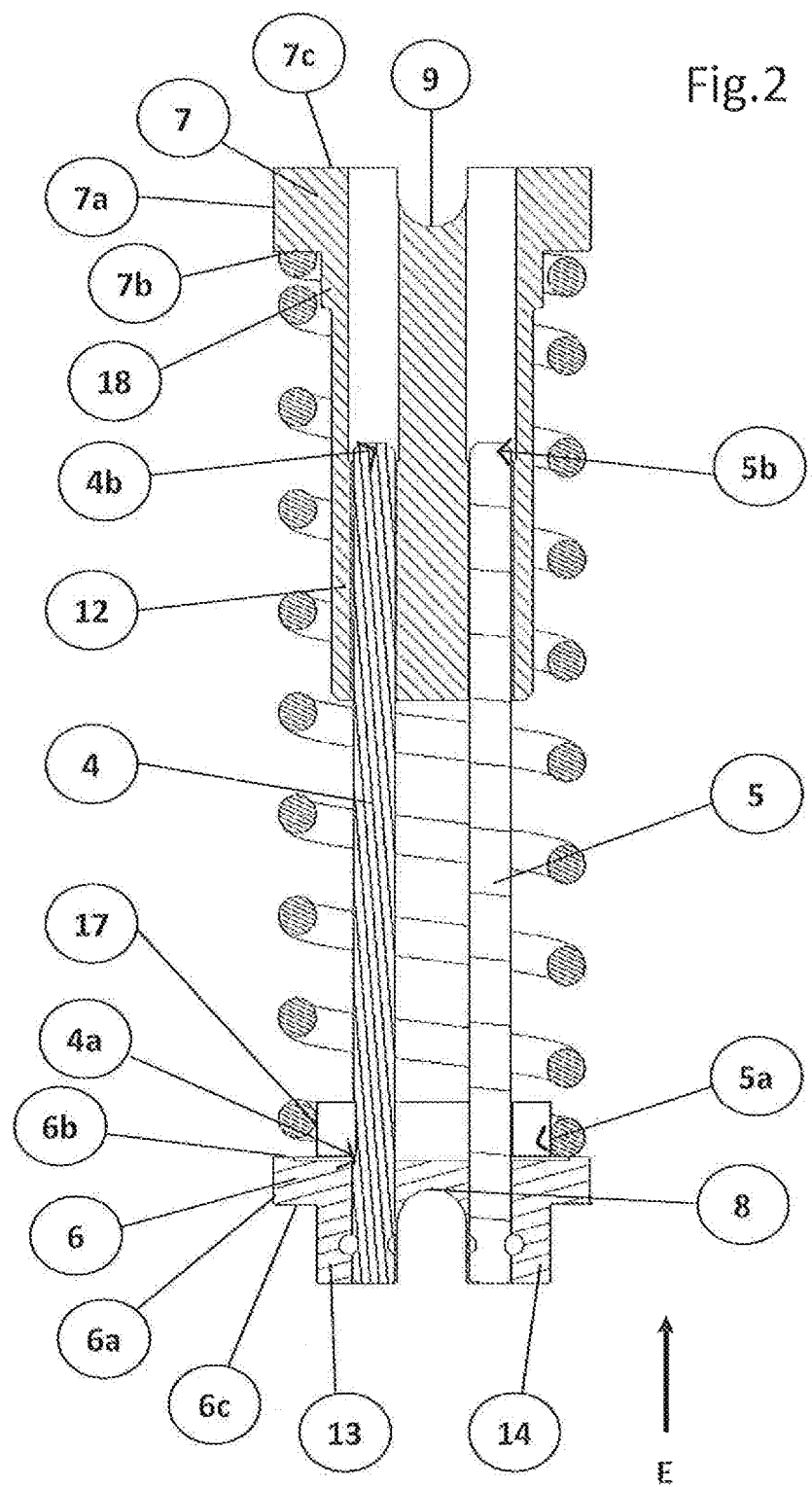
Figure 3:
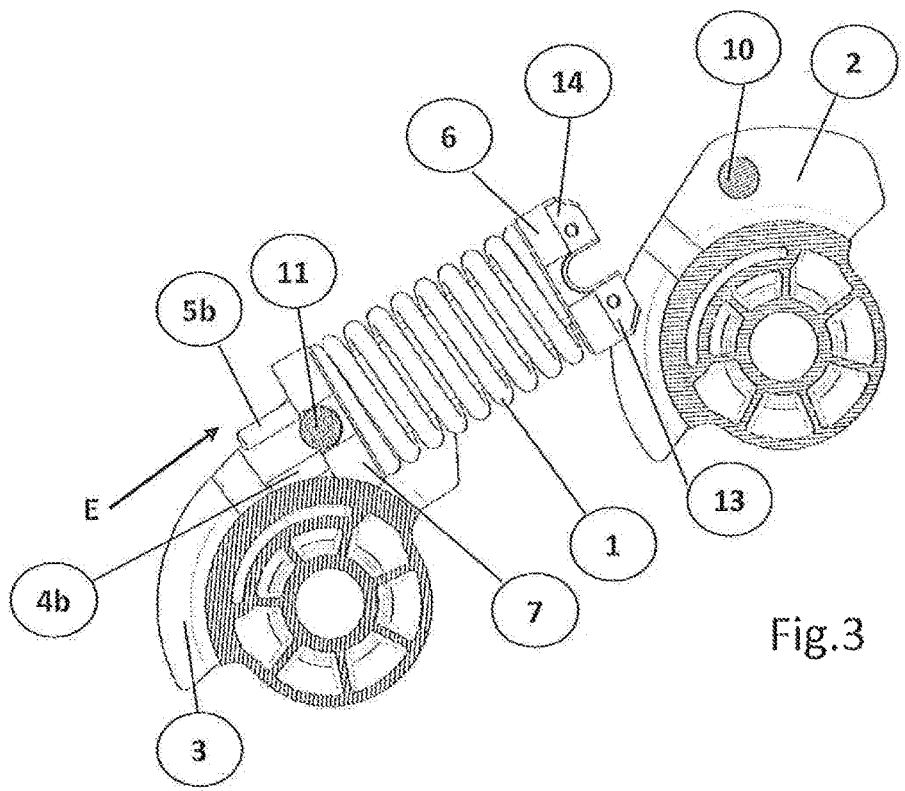
Figure 4:
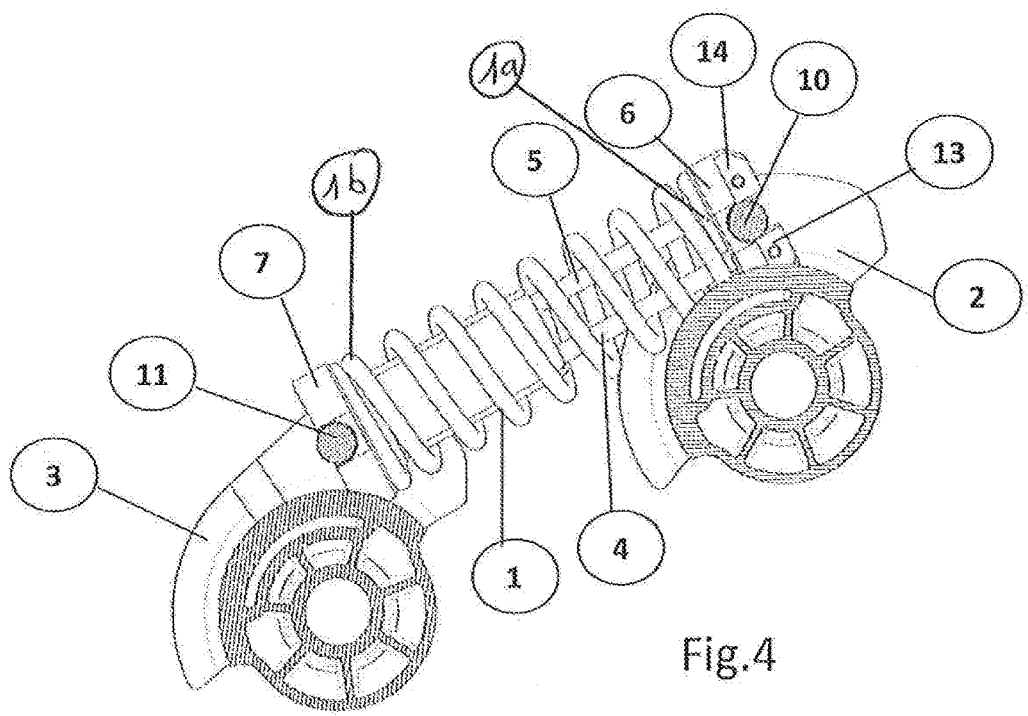
Figure 5:
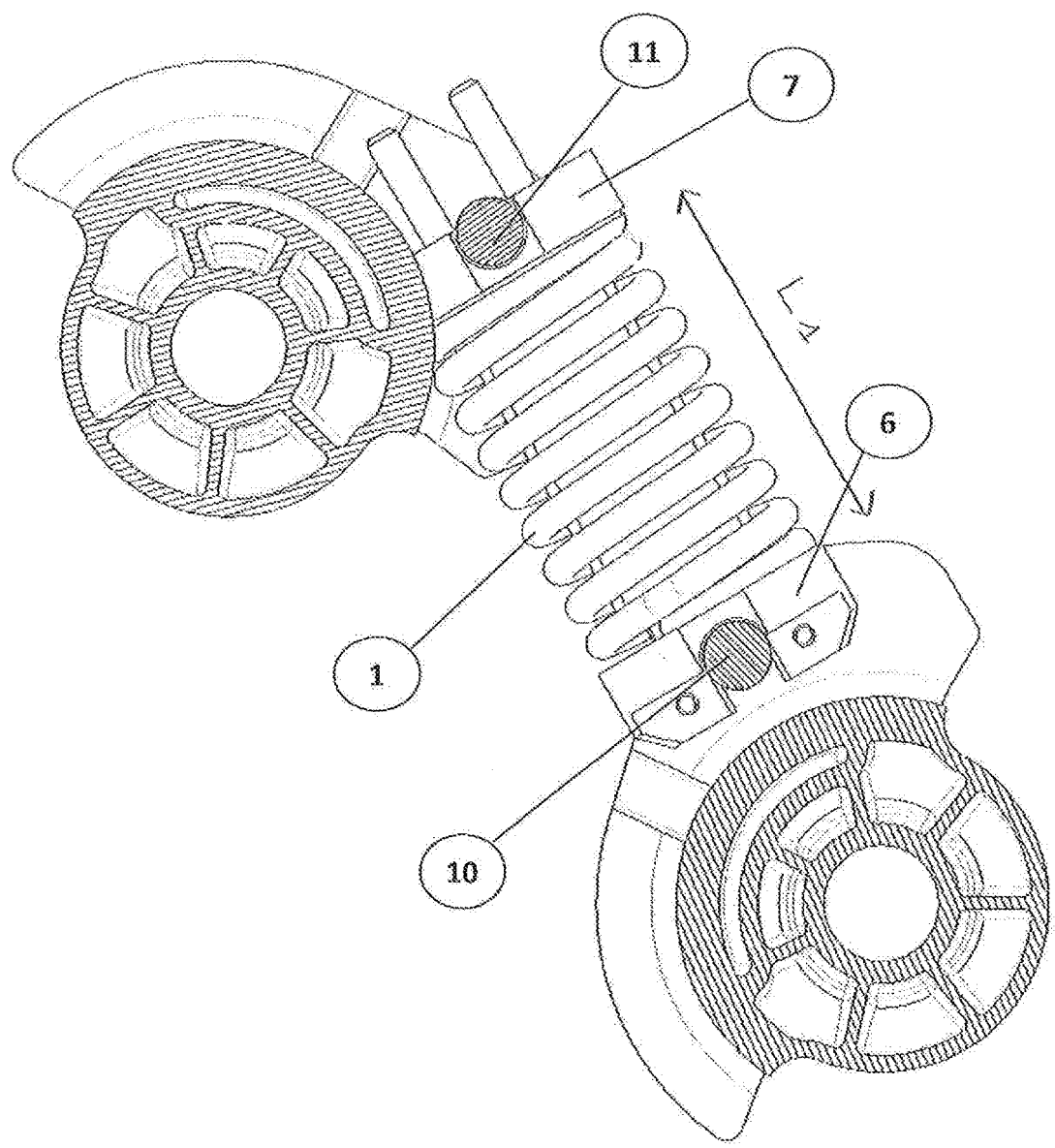
Figure 6:
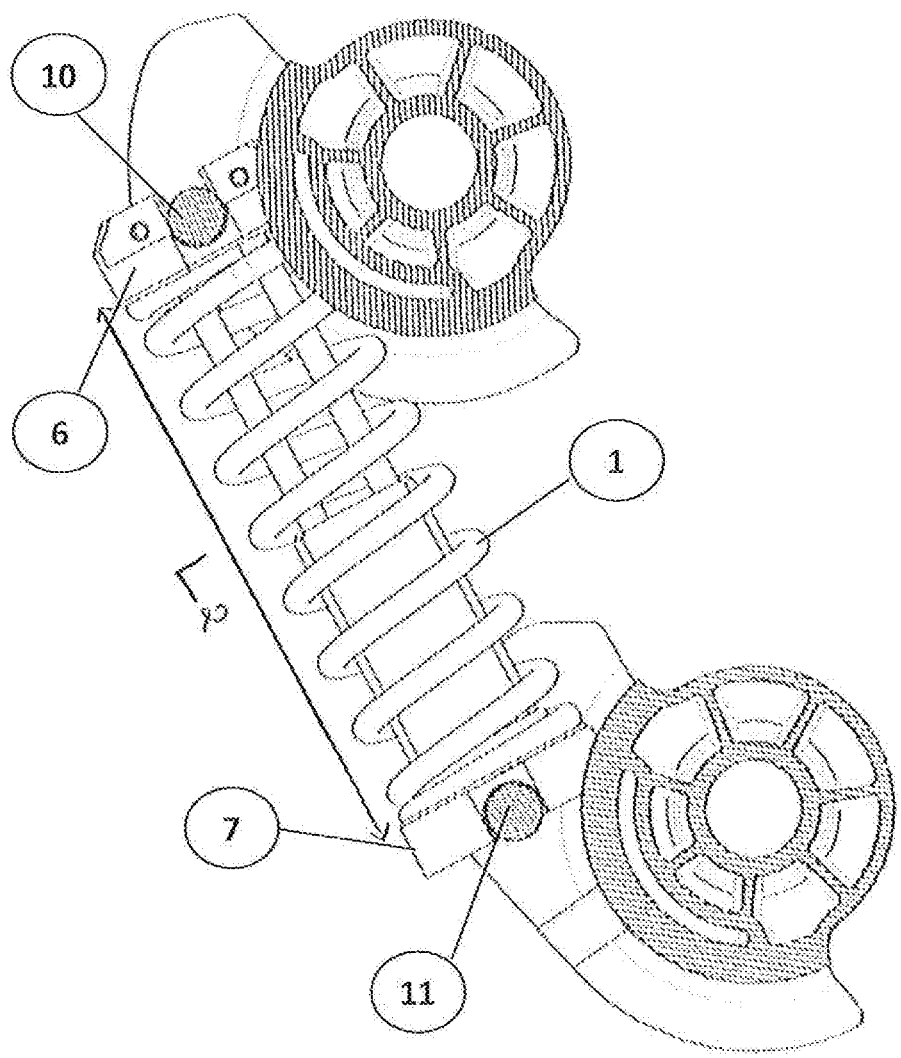
Figure 7:
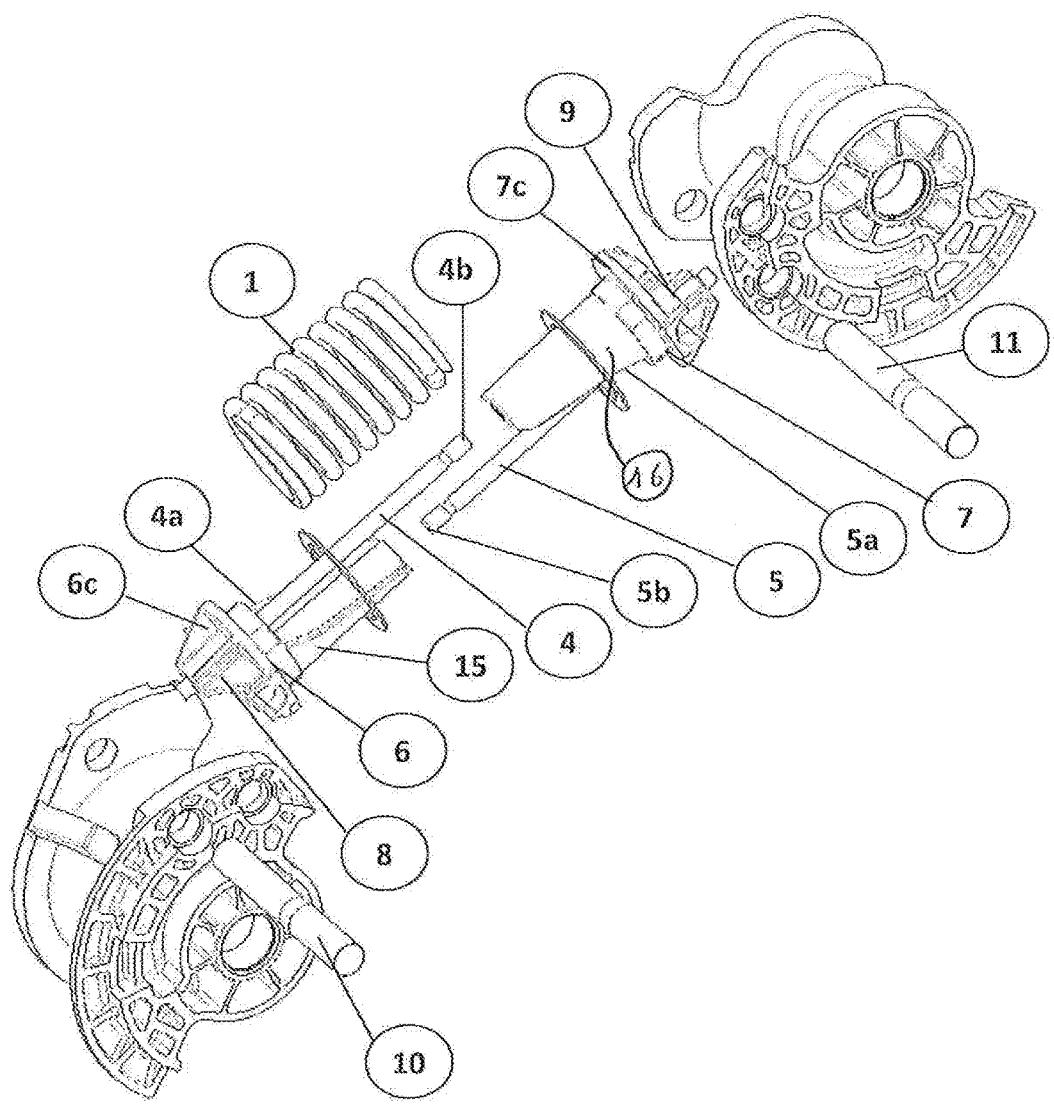
Figure 8:
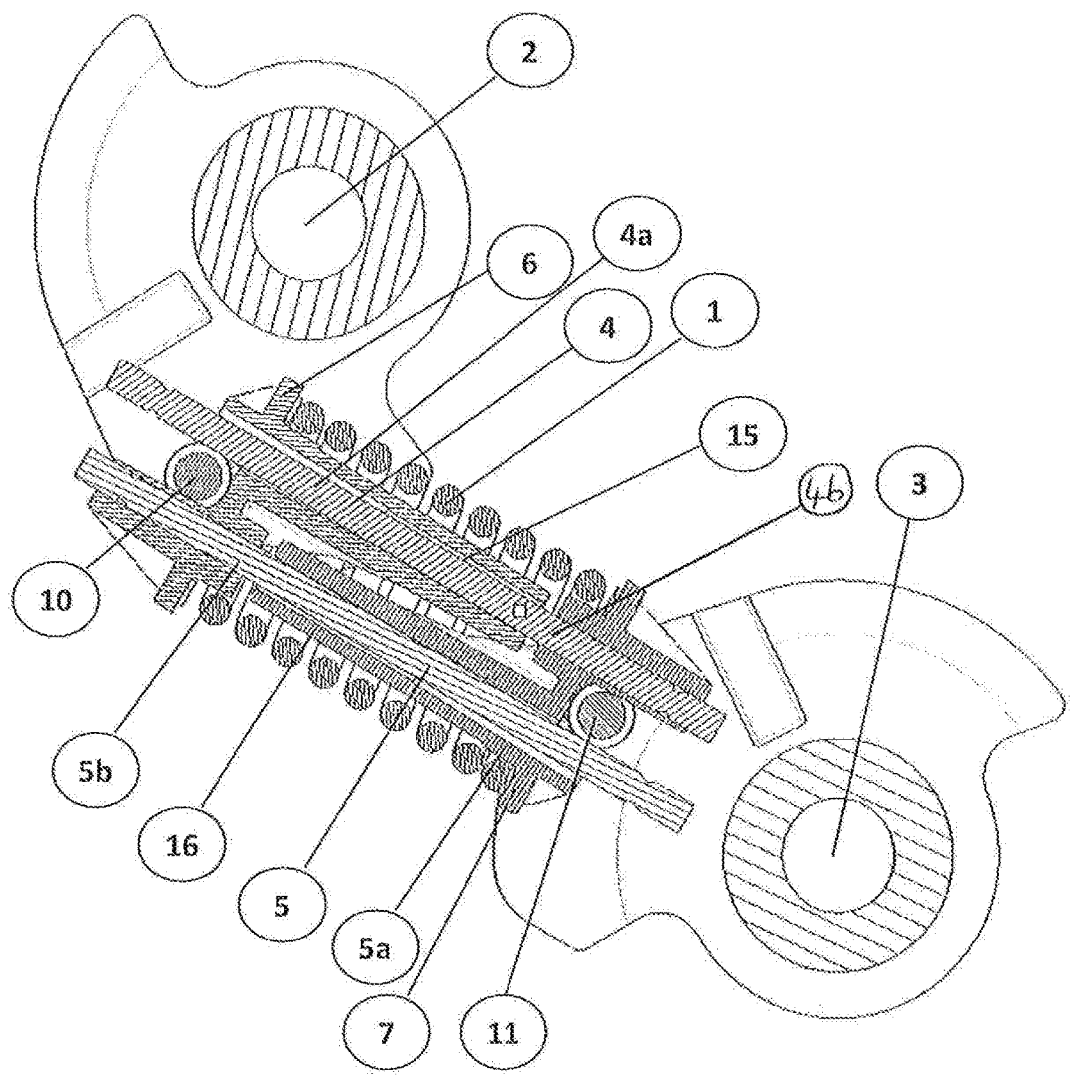
Figure 9:
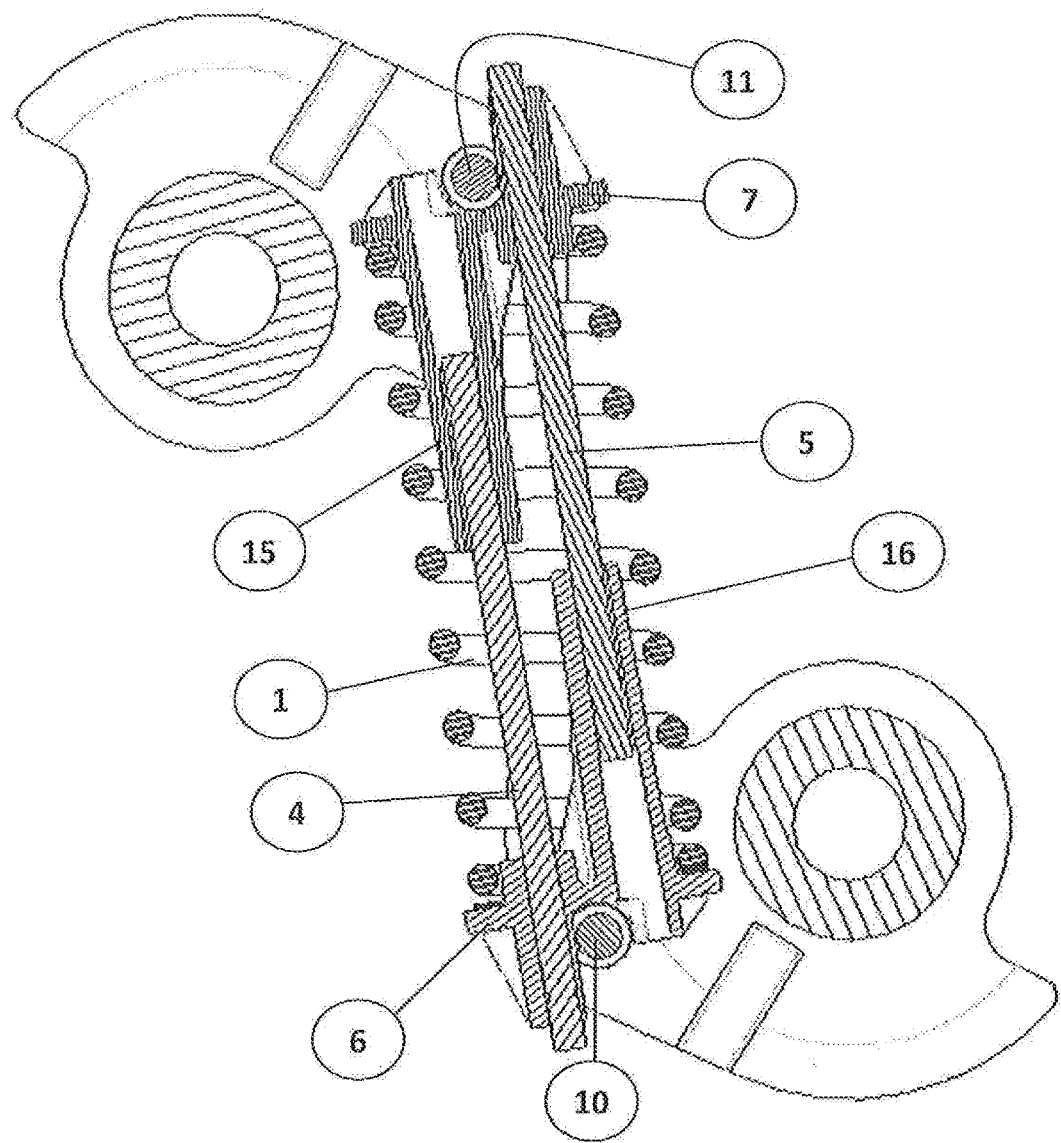

However, other advantages and features of the invention will become more apparent from the following detailed description referring to the attached drawings given purely by way of example and in which:

FIGS. 1 to 6 illustrate a first embodiment of a guiding device according to the invention, FIG. 1 is a perspective view of the guiding device according to this first embodiment, FIG. 2 is a view in longitudinal cross section of the same guiding device, along a plane passing through the axes of the two rods, FIGS. 3 and 4 are two perspective views illustrating the mounting of the device, FIGS. 5 and 6 are two perspective views illustrating the guiding device respectively in a compressed position and in a decompressed position of the spring, FIGS. 7 to 9 illustrate a second embodiment of the guiding device according to the invention, FIG. 7 is a perspective view illustrating the different constituent elements of the device, FIGS. 8 and 9 are cross-sectional views along a plane passing through the two axes of the two rods, of the guiding device according to the invention, respectively in compressed position and in decompressed position of the spring.

In the figures, there can be seen a device D for guiding a spring according to the invention, said spring 1 belonging, for example, to a so-called tumbler mechanism, this mechanism forming part of the control device of an electrical protection apparatus such as a circuit breaker.

As is known per se, such a device is intended to be placed between two shafts 2,3 respectively, for example an operating shaft intended to be actuated by a user and a shaft for driving the mobile contacts of the apparatus (these contacts not being represented).

According to the embodiment of the device illustrated in FIGS. 1 to 6, this guiding device D comprises an assembly comprising two rods 4,5 fixed respectively by one of their ends 4a,5a to a first base 6 and mounted to slide by their opposite end 4b,5b inside a so-called second base 7, and a so-called compression spring 1 mounted around the two rods and bearing by its two opposing ends 1a,1b on the two bases 6,7. These two bases each comprise a void 8,9 of substantially cylindrical form intended to receive an axis 10,11 secured to one of the abovementioned shafts 2,3. This assembly is intended to be placed between the abovementioned two axes 10,11 as will be described hereinbelow.

As is more particularly illustrated in FIGS. 1 and 2, the two bases 6,7 each comprise a portion of substantially cylindrical form 6a,7a forming, by one of its flat faces, a bearing surface 6b,7b for the spring 1. The bearing surface 7b of the second base 7 comprises a protruding element 12 of substantially cylindrical form constituting a guiding portion for the spring when the latter is mounted around this portion. These two bases comprise, on their flat face 6c,7c opposite the preceding one, the abovementioned void of partially cylindrical form 8,9, this void being capable of receiving one of the abovementioned axes. The first base 6 further comprises two elements 13,14 extending from this same surface outwards from said assembly E in a direction substantially at right angles to the plane of said surface, these two elements, called guiding elements for the axes, being intended to facilitate the placing of the axes 10,11 in the abovementioned voids when the guiding assembly E is placed in the mechanism. It will also be noted that the two bases 6,7 have, on their bearing surface 6b,7b for the spring 1, respectively two cylindrical portions 17,18 having a diameter slightly greater than the diameter of the guiding portion 12, and intended to receive, respectively, the two end parts 1a,1b of the spring 1.

As is more particularly illustrated in FIGS. 1 and 2, it can be seen that the guiding portion 12 grips the two rods 4,5 while allowing the sliding of the rods inside said portion.

The guiding portion 12 belonging to the second base 7 extends over a length corresponding substantially to half of the length of the rods 4,5.

FIGS. 3 and 4 illustrate the mounting of the guiding assembly between the two axes.

In FIG. 3, the spring 1 has been compressed by bringing the bases 6,7 closer to one another, and the assembly E is positioned between the two axes 10,11 in such a way that the decompression of the spring 1 allows the introduction of one 10 of the so-called first axes, between the guiding elements 13,14, and of the other axis 11, called second axis, between the end parts 4b,5b of the two rods 4,5, the latter having been uncovered upon the compression of the spring 1 and being able to be brought on either side of the so-called second axis 11, this position being represented in FIG. 4. In this last figure, the two ends 1a,1b of the spring 1 are bearing respectively on the two bases 6,7, and the two bases are bearing respectively on the two axes 10,11.

In FIGS. 5 and 6, it can be seen that the distance L2 between the two bases 6,7 in decompressed position of the spring 1 corresponds substantially to twice the distance L1 between the two bases 6,7 in compressed position of the spring 1.

According to the embodiment described in FIGS. 7 to 9, the two rods 4,5 are fixed by one 4a,5a of their ends respectively to two different bases 6,7, and each base 6,7 comprises a sleeve-forming guiding element 15,16 extending in the direction of the other base, said guiding element being intended to slidingly receive the free end 4b,5b of the rod 4,5 fixed to the other 7,6 of the two bases 6,7.

These two guiding elements called sleeves 15,16 also make it possible to guide the displacement of the spring 1 mounted both around the two rods 4,5 and these two sleeve-forming guiding elements 15,16. In the same way as in the preceding embodiment, the outer surface 6c,7c of the bases 6,7 has a void 8,9 intended to receive one of the axes 10,11. The placement of this assembly E is done in the same way as previously described for the preceding embodiment and will not therefore be described further.

In the compressed and decompressed positions illustrated respectively in FIG. 8 and FIG. 9, the spring 1 is bearing by its two opposing ends 1a,1b respectively on the abovementioned two bases 6,7, which bases are bearing respectively on the abovementioned two axes 10,11.

By virtue of the invention, a device for guiding a spring has therefore been produced that makes it possible to obtain a correct alignment of the force of the spring relative to the trajectory of its displacement. This solution makes it possible to have a minimal spring guiding length substantially equal to six times the diameter of each guiding rod.

This alignment quality makes it possible to eliminate the effects of deformation and of beating of the spring at the end of the opening and closing operations, and reduces the stresses on each of the parts of the guiding device. It also makes it possible to reduce the lever arm effects of the mechanism.

This device for guiding the spring can be installed or dismantled easily without it being necessary to dismantle the mechanism.

The small diameters of the guiding rods make it possible to reduce the bulk of the system.

It has been observed that after 20000 operations, there is no visible trace of wear, or slits or cracks on the parts tested.

Obviously, the invention is not limited to the embodiments described and illustrated which have been given purely by way of example.

On the contrary, the invention comprises all the technical equivalents of the means described as well as their combinations provided the latter are produced in the spirit thereof.

The invention claimed is:

1. A device for guiding a spring belonging to a control mechanism having first and second axes of which at least one axis of the first and second axes is linked mechanically to an operating shaft, said device comprising:
   a compression spring having first and second ends;
   a first slideable element including:
      a guiding portion for guiding movement of the compression spring during compression and including first and second holes passing lengthwise through the guiding portion, and a first base including (a) a notch configured to link the first base in an articulated manner to the first axis, and (b) a first bearing surface configured to abut the first end of the compression spring, wherein the first and second holes passing through the guiding portion continue through the first base;

a second slideable element including:
a second base including (a) a notch configured to link the second base in an articulated manner to the second axis, and (b) a second bearing surface configured to abut the second end of the compression spring, and first and second parallel rods, each rod of the first and second parallel rods having (a) a fixed end being fixed onto said second base, and (b) a free end being mounted to slide through a respective one of the first and second holes and extend out of the first base.

2. The guiding device according to claim 1, wherein the guiding portion comprises, by its outer surface, a means for guiding the spring.

3. The guiding device according to claim 1, wherein said guiding portion extends over a length corresponding substantially to half of the length of the first and second rods.

4. A guiding device for a control mechanism having first and second axes of which at least one axis of the first and second axes is linked mechanically to an operating shaft, said device comprising:

two elements capable of sliding relative to one another and being linked in an articulated manner respectively to the first and second axes, wherein the two elements have a first base and a second base, respectively;

a compression spring mounted around the two elements and bearing by its two opposing ends respectively on the first and second axes via the first and second bases, each of the first and second bases of the two elements being mounted in an articulated manner relative to one of the first and second axes; and first and second rods, wherein the first rod is fixed by one of its ends to the first base and the second rod is fixed by one of its ends to the second base, and wherein the first base comprises a first sleeve-forming part capable of slidingly receiving a free end of the second rod and the second base comprises a second sleeve-forming part capable of slidingly receiving a free end of the first rod such that when the free ends of the first and second rods are mounted in the second and first sleeve-forming parts, respectively, said first and second rods extend substantially parallel to one another.

5. The guiding device according to claim 4, wherein said first and second sleeve-forming parts constitute, by their outer surface, a means for guiding the spring.

6. The guiding device according to claim 4, wherein said first and second sleeve-forming parts extend over a length corresponding substantially to half of the length of the first and second rods.

7. The guiding device according to claim 4, wherein said first and second sleeve-forming parts constitute, by their outer surface, a spring guide.

8. The guiding device according to claim 4, wherein the first base includes a first hole for allowing the free end of the second rod to pass through, and
wherein the second base includes a second hole for allowing the free end of the first rod to pass through.

9. In an electrical protection apparatus having first and second axes of which at least one axis of the first and second axes is linked mechanically to an operating shaft, the improvement comprising a spring-guiding device comprising:

two elements capable of sliding relative to one another and being linked in an articulated manner respectively to the first and second axes, wherein the two elements have a first base and a second base, respectively;

a compression spring mounted around the two elements and bearing by its two opposing ends respectively on the first and second axes via the first and second bases, each of the first and second bases of the two elements being mounted in an articulated manner relative to one of the first and second axes; and first and second rods, wherein the first rod is fixed by one of its ends to the first base and the second rod is fixed by one of its ends to the second base, and wherein the first base comprises a first sleeve-forming part capable of slidingly receiving a free end of the second rod and the second base comprises a second sleeve-forming part capable of slidingly receiving a free end of the first rod such that when the free ends of the first and second rods are mounted in the second and first sleeve-forming parts, respectively, said first and second rods extend substantially parallel to one another.

10. In the improvement according to claim 9, wherein said apparatus is a medium voltage switch-disconnector.

11. In the improvement according to claim 9, wherein the first base includes a first hole for allowing the free end of the second rod to pass through, and
wherein the second base includes a second hole for allowing the free end of the first rod to pass through.

12. In the improvement according to claim 10, wherein the first base includes a first hole for allowing the free end of the second rod to pass through, and
wherein the second base includes a second hole for allowing the free end of the first rod to pass through.

* * * * *